(12) United States Patent
Clark et al.

(10) Patent No.: US 7,759,942 B2
(45) Date of Patent: Jul. 20, 2010

(54) LIGHTWEIGHT, LOW COST STRUCTURE FOR FORMATION CONDUCTIVITY MEASURING INSTRUMENT

(75) Inventors: Brian Clark, Sugar Land, TX (US); Mark Frey, Sugar Land, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 710 days.

(21) Appl. No.: 11/692,451

(22) Filed: Mar. 28, 2007

(65) Prior Publication Data

US 2008/0238427 A1 Oct. 2, 2008

(51) Int. Cl.
*G01V 3/18* (2006.01)
*G01V 3/00* (2006.01)
*G01V 3/02* (2006.01)

(52) U.S. Cl. .................. 324/347; 324/346; 324/355
(58) Field of Classification Search .......... 324/347, 324/355–356, 346; 702/6–8
See application file for complete search history.

(56) References Cited

U.S. PATENT DOCUMENTS

| 4,651,101 | A | 3/1987 | Barber et al. |
| RE32,564 | E | 12/1987 | Scholberg |
| 4,714,889 | A * | 12/1987 | Chapman et al. ............ 324/366 |
| 4,968,940 | A | 11/1990 | Clark et al. |
| 5,235,285 | A | 8/1993 | Clark et al. |
| 5,463,319 | A * | 10/1995 | Chesnutt et al. ............ 324/339 |
| 5,661,402 | A | 8/1997 | Chesnutt et al. |
| 6,933,726 | B2 | 8/2005 | Chen et al. |
| 7,069,775 | B2 | 7/2006 | Fredette et al. |
| 7,131,210 | B2 | 11/2006 | Fredette et al. |
| 2004/0061622 | A1 | 4/2004 | Clark |
| 2004/0089475 | A1 | 5/2004 | Kruspe et al. |
| 2006/0186328 | A1 | 8/2006 | Radtke et al. |
| 2006/0192561 | A1 | 8/2006 | Chesser et al. |
| 2006/0192562 | A1 | 8/2006 | Davydychev et al. |
| 2006/0290353 | A1 | 12/2006 | Fredette et al. |
| 2006/0290354 | A1 | 12/2006 | Fredette et al. |

FOREIGN PATENT DOCUMENTS

GB 2427219 12/2006

* cited by examiner

*Primary Examiner*—Bot L LeDynh
(74) *Attorney, Agent, or Firm*—Kevin McEnaney; Darla Fonseca; Charlotte Rutherford (57) ABSTRACT

A well logging instruments includes an electrically conductive sonde mandrel. At least one electrical sensor is affixed to an exterior of the mandrel. The sensor is configured to be attached to the mandrel by sliding along an exterior surface thereof. A pressure-sealing electrical feedthrough bulkhead makes electrical connection from the at least one sensor through a wall of the mandrel.

17 Claims, 9 Drawing Sheets

LIGHTWEIGHT, LOW COST STRUCTURE FOR FORMATION CONDUCTIVITY MEASURING INSTRUMENT

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The invention relates generally to the field of instruments used to measure electrical conductivity of Earth formations penetrated by a wellbore. More particularly, the invention relates to arrangements of transmitter, receiver and electrode elements for such conductivity measuring instruments.

2. Background Art

Various types of well logging instruments are known in the art for measuring electrical properties of Earth formations penetrated by a wellbore, such as conductivity or its inverse, resistivity. Some such instruments are conveyed into a wellbore at one end of an armored electrical cable and are known as "wireline" instruments. Wireline instruments can also be conveyed into a wellbore using pipe or coiled tubing, but the structure of such instruments is essentially the same as that of the instruments conveyed by armored electrical cable.

Typical wireline conductivity measuring instruments include electrodes and/or wound wire coils disposed on an electrically non-conductive mandrel. Because of the mechanical properties of the materials typically used to make up the mandrel, such as glass fiber reinforced plastic, typical conductivity measuring wireline instruments have one mandrel to house the electrodes and/or wire coils and a separate mandrel to house signal generating and detecting circuitry. One such instrument, which includes longitudinally wound wire coils acting as transmitter and receiver antennas is described in U.S. Pat. No. 4,651,101 issued to Barber et al. and assigned to the assignee of the present invention. Another such instrument which includes electrodes that impact electrical current into the wellbore and surrounding formations and measure resulting voltages is disclosed in U.S. Reissue Pat. No. RE32,564 issued to Scholberg and assigned to the assignee of the present invention.

In any of the foregoing types of instruments, the mandrel that includes the electrodes and/or wire coils may be filled with substantially incompressible liquid such as oil to maintain the integrity of the electrodes and/or wire coils and to prevent crushing of the mandrel under the very high hydrostatic pressures that may be present in a wellbore. The materials used to make the electrically non-conductive mandrel are typically not strong enough to withstand such pressure absent being filled with incompressible liquid. The oil typically must be equalized to the hydrostatic pressure by a compensator such as a piston or elastomer bladder. Such mandrel construction may be expensive and difficult to maintain, and is subject to leakage of the pressure compensation fluid and/or failure of the pressure compensator. Failure of the compensator may cause a catastrophic failure of the mandrel.

Formation resistivity measuring instruments are known in the art for measuring resistivity during the drilling of the wellbore through the subsurface formations. One such instrument is described, for example in U.S. Pat. No. 5,235,285 issued to Clark et al. and assigned to the assignee of the present invention. The instrument described in the '285 patent includes a toroidal antenna disposed on a electrically conductive mandrel. The mandrel is a "drill collar" forming part of a string of drilling tools used to drill through the subsurface formations. Electrical current is passed through the toroidal antenna to induce electrical current to flow, including along the mandrel. One or more electrodes may be disposed in a blade proximate the wellbore wall such that measured voltage at the electrode can provide an indication of the formation resistivity.

Another instrument that may be disposed in a conductive mandrel such as a drill collar is described in U.S. Pat. No. 4,968,940 issued to Clark et al. and assigned to the assignee of the present invention. The instrument disclosed in the '940 patent includes longitudinally wound loop antennas disposed at selected locations on the exterior of a drill collar or similar conductive mandrel. Certain of the loop antennas serve as transmitters and have alternating electrical current typically in a frequency range of 400 kHz to 2 MHz, passed through them to include electromagnetic fields in the formations surrounding the wellbore. Two of the loop antennas serve as receivers. Properties of electrical current induced in the receiver antennas are measured, such as phase shift and amplitude change with respect to the transmitter current. Such measured properties are related to the electrical resistivity of the formation surrounding the wellbore proximate the positions of the loop antennas.

SUMMARY OF THE INVENTION

A well logging instrument according to one aspect of the invention includes an electrically conductive sonde mandrel. At least one sensor is affixed to an exterior of the mandrel. A pressure-sealing electrical feedthrough bulkhead makes electrical connection from the at least one sensor through a wall of the mandrel. In one embodiment, an opening in the wall of the mandrel includes a receptacle affixed therein for sealingly receiving the bulkhead. In one embodiment an external diameter of the mandrel is at most about 3.75 inches. In one embodiment, a maximum wall thickness of the mandrel is about 0.35 inches.

Other aspects and advantages of the invention will be apparent from the following description and the appended claims.

DETAILED DESCRIPTION

Figure 1A:
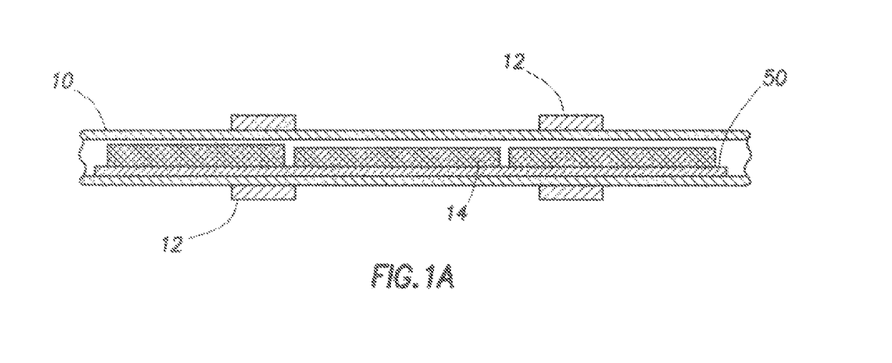
FIGS. 1A and 1B are a generalized cross section and oblique view, respectively, of one example of an antenna or electrode arrangement ("sensor") on an instrument according to the invention.
Figure 1B:
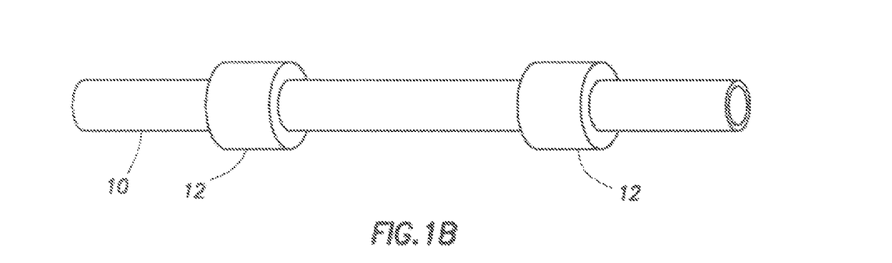

A generalized view of one example electrical resistivity measuring instrument according to the various aspects of the invention is shown in FIGS. 1A and 1B, of which FIG. 1A is a cut away or cross sectional view and FIG. 1B is an oblique external view. The instrument may be disposed within and outside of an electrically conductive, preferably metal sonde mandrel 10. The mandrel 10 may be a solid, single walled tube, preferably made from steel, from non-magnetic alloy such as INCONEL, which is a registered trademark of Huntington Alloys Corporation, Huntington, W.Va. or monel, or from titanium. Notwithstanding its cost, titanium may be preferred in some examples because of its high strength, non-ferromagnetic properties and its low density. The mandrel 10 may be on the order of 2 to 5 meters length, depending on the axial (longitudinal) spacing needed between the most distal of a plurality of sensors 12 disposed at selected positions on the exterior of the mandrel, 10. The mandrel 10 may have an external diameter selected to be compatible with well logging instruments that are typically conveyed into and out of the wellbore by means of armored electrical cable. Such diameter may be in a range of about 1.6 to 3.75 inches (approximately 4 to 10 centimeters).

By way of examples, a mandrel made from number 304 alloy stainless steel having length of 12 feet (4 meters), external diameter of 1.6 inches and 0.2 inches wall thickness would weigh 36 pounds, could withstand external (hydrostatic) pressure of 11,000 pounds per square inch (psi) and would have a tensile failure stress of 37,000 pounds. Using the same dimensions, a sonde mandrel made from 120 ksi tensile strength titanium would have a pressure resistance of 30,000 psi, a tensile failure strength of 90,500 and would weigh only 20 pounds. In one example, a sonde mandrel according to the invention may have a maximum wall thickness of 0.35 inches.

The sensors 12 may be any sensing element. In some examples the sensor may be an antenna configured to produce a voltage when exposed to an electromagnetic field or to emit an electromagnetic field when an electric current is passed therethrough. Non-limiting examples of such sensors include wire coils wound longitudinally, toroidally wound coils or loop antennas, dipole antennas, transversely wound wire coils (e.g., saddle coils), or combinations of the foregoing. The sensors 12 may also be galvanic electrodes for emitting and/or detecting electric fields. The sensors 12 may also include combinations of galvanic and electromagnetic sensing elements. Generally, the sensors 12 may be configured to move along the exterior of the mandrel 10 for assembly thereto. The manner of affixing the sensors 12 to the mandrel 10, and for making electrical connection through the wall of the mandrel 10 will be further explained below. Disposed inside the mandrel 10 (FIG. 1A) are various electronic circuits 14 that energize those of the sensors 12 intended to emit electric current or electromagnetic waves and to detect voltages impressed on others of the sensors 12. In one example through wiring may be disposed inside an electrically conductive conduit 50, as will be further explained below, to shield the electronics 14 from electromagnetic interference.

Figure 2A:
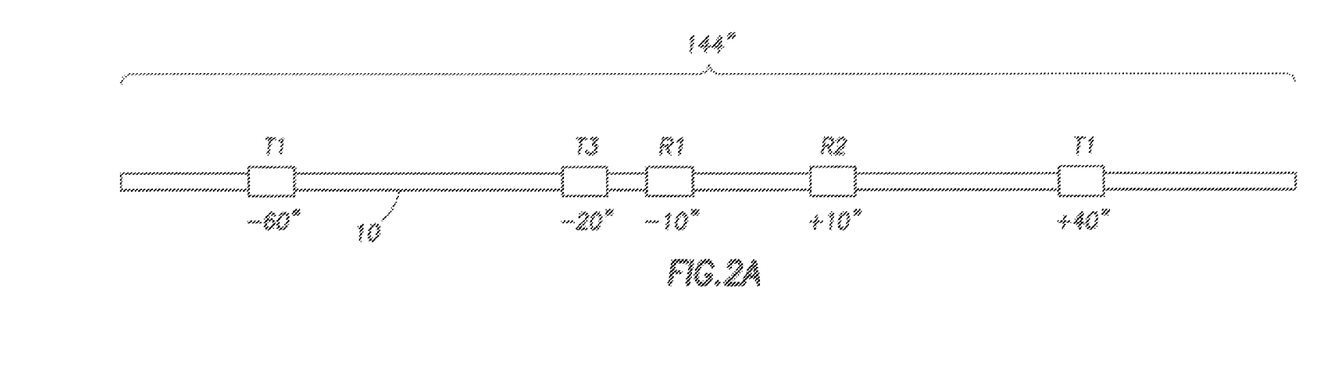
FIGS. 2A, 2B and 2C show various examples of antenna and/or electrode (sensor) arrangements using a structure according to the invention.
Figures 2B, 2C:
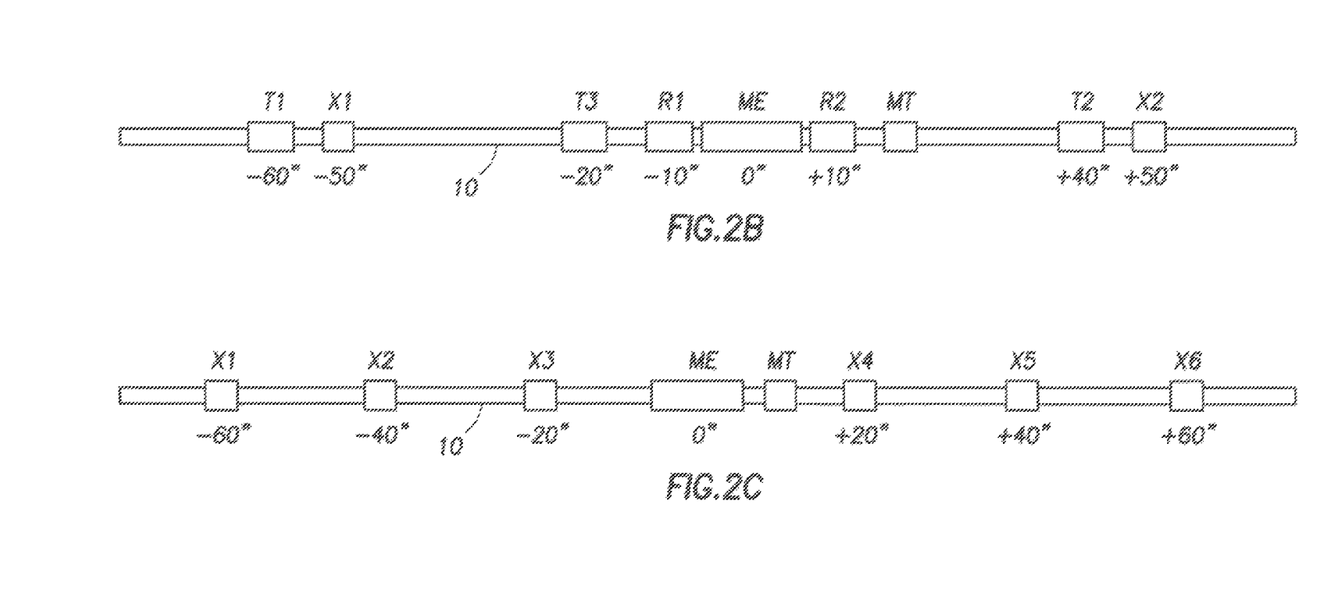

Examples of various sensors and longitudinal positions thereof on the mandrel 10 are shown in FIGS. 2A, 2B, and 2C. FIG. 2A shows an example of an instrument that measures resistivity (or conductivity) using the principle of electromagnetic propagation. See, e.g., U.S. Pat. No. 4,968,940 issued to Clark et al., assigned to the assignee of the present invention and referred to in the Background section herein. The sensors used in the example shown in FIG. 2A are longitudinally wound coils or loop antennas, and are arranged as electromagnetic transmitters T1, T2 and T3, and electromagnetic receivers, shown at R1, R2 and R3. The number below each of the transmitters and receivers indicates the longitudinal distance in one direction (positive numbers) or the other (negative numbers) with respect to a "measure point" (the axial position along the mandrel 10 that corresponds to the longitudinal position of the measurement being made by the instrument).

An example instrument that includes the foregoing electromagnetic propagation resistivity measurement elements, as well as a form of galvanic resistivity measurement, in shown in FIG. 2B. In addition to all the transmitters and receivers shown in FIG. 2A, the example instrument in FIG. 2B includes toroidal antennas, shown generally at X1 and X2, and electrodes shown at ME and MT. The number below each of the foregoing is also a longitudinal distance referenced with respect to the measure point of the instrument as is the case for the instrument shown in FIG. 2A.

In another example, shown in FIG. 2C, a multiple depth of investigation galvanic resistivity instrument can be configured by including a plurality of toroidal antennas, such as shown at X1, X2, X3, X4 and X5. Multiple depth of investigation as used herein, and as will be readily familiar to those skilled in the art, means that focusing currents measuring current to travel laterally further into the formations adjacent the wellbore before dispersing, such that the measurement made corresponds to laterally more distant formations from the wall of the wellbore.

Figure 3:
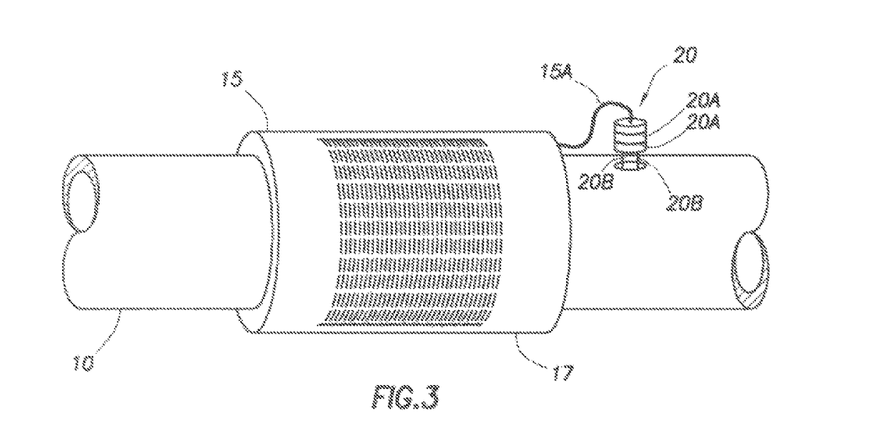
FIG. 3 shows an example of mounting a wire coil sensor to a sonde mandrel according to the invention.

One example of a longitudinally wound antenna, such as T1 or R1 in FIG. 2A and used for electromagnetic propagation measurements, is shown in FIG. 3. The antenna 15 may consist of a plurality of turns of insulated electrical wire, disposed in an insulating substrate 17 such as rubber or other elastomer, or epoxy resin. The ends of the antenna coil may form a lead in cable 15A that can be coupled to electrical terminals of a pressure sealing, electrical feed-through bulkhead 20 of types well known in the art. One such bulkhead is sold under model designation "PMF" by Kemlon Products and Development, 1424 N. Main St., Pearland, Tex. 77581. The bulkhead 20 may include two or more electrical feedthrough contacts 20B that establish electrical connection between the conductors in the lead in cable 15A and the electrical circuitry (14 in FIG. 1A). Fluid under pressure may be excluded from passing through the opening in the wall of the mandrel 10 in which the bulkhead 20 is inserted by one or more o-rings 20A or similar elastomer seal. In assembling the antenna 15 to the mandrel 10, the antenna 15 disposed in the substrate 17, is slid over the mandrel 10 until the desired longitudinal position is reached. Then the lead in cable 15A is inserted into the opening to make contact with the electronic circuits inside the mandrel 10.

Figure 4A:
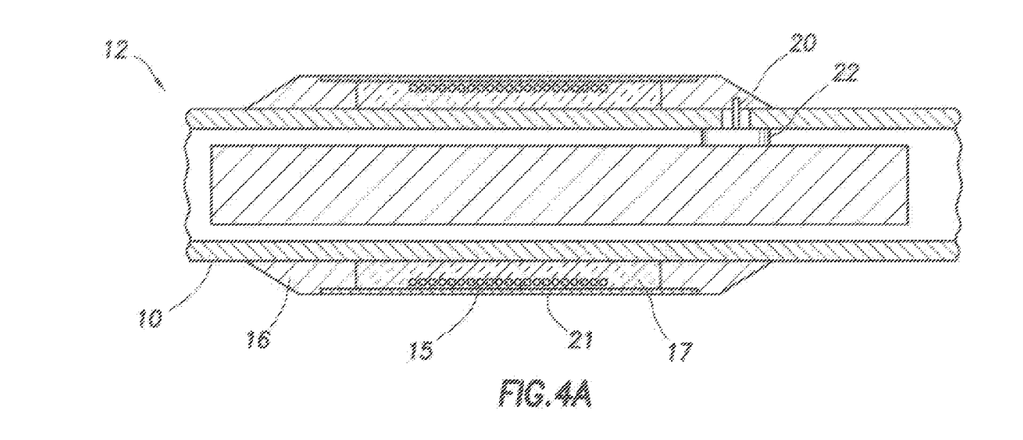
FIGS. 4A and 4B show a cross section and an oblique view, respectively, of one example of a solenoid antenna mounted to a sonde mandrel according to the invention.
Figure 4B:
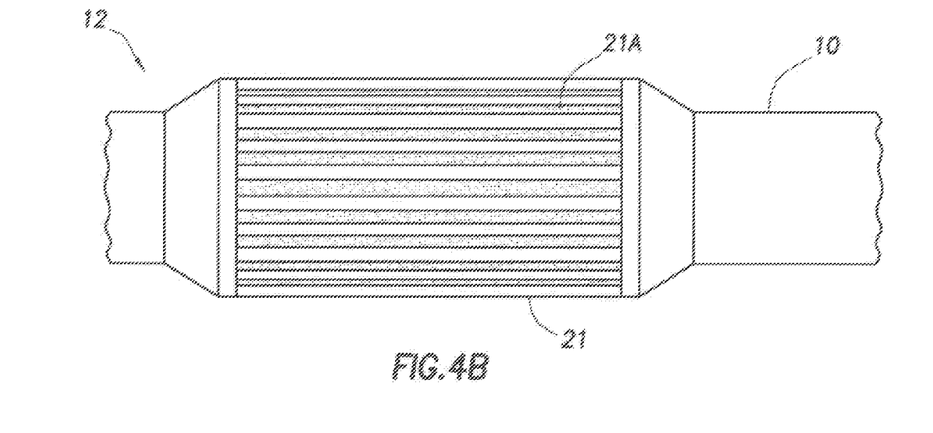

A cross section and side view of the antenna shown in FIG. 3 including external shielding is shown in FIGS. 4A and 4B, respectively. The antenna coil 15 and insulating substrate 17 as they are applied to the mandrel 10 are shown in their assembled longitudinal position. A shield 21 surrounds the antenna coil 15 and substrate 17. The shield 21 is preferably made from steel or other high strength material, and preferably includes hard faced wear bands 16 on its longitudinal ends. The wear bands 16 may have a slightly larger external diameter than the center portion of the shield 21 to as to reduce the amount of contact between the wellbore wall and the exterior of the shield 21. The wear bands 16 may include a hard material exterior surface applied to the base material of the shield 21, such as tungsten carbide or cubic boron nitride. The shield 21 in some examples may be assembled from two circumferential half sections, as will be explained in more detail with reference to FIGS. 5A and 5B. An external view of the shield 21 is shown in FIG. 4B. The shield 21 may include a plurality of longitudinally extending, circumferentially spaced apart slots 21A that make the shield 21 relatively transparent to electromagnetic energy radiating from the antenna 15 as shown in FIG. 3 and in the frequency range used for electromagnetic propagation measurements (approx 0.4 to 2.0 MHz).

Figure 5A:
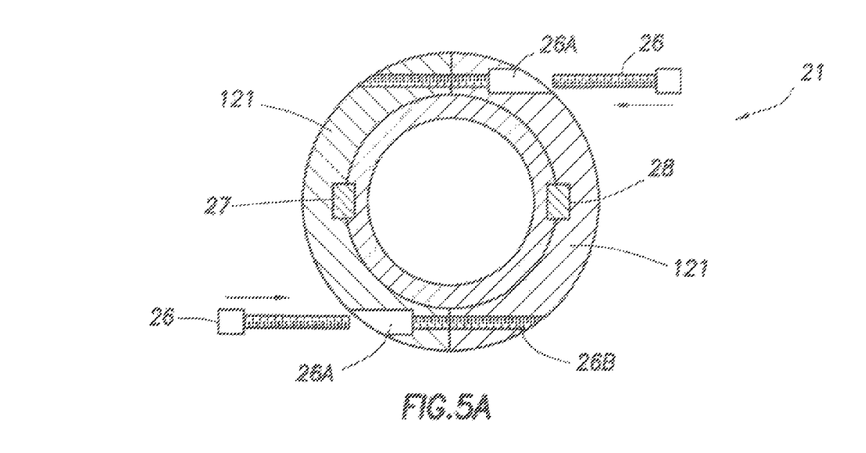
FIGS. 5A and 5B show, respectively, a cross section and a side view of shielding mounting for the example antenna shown in FIGS. 4A and 4B.

One example of the shield 21 that may be affixed to the exterior of the mandrel 10 by assembling two, circumferentially separated half-shields 121 is shown in cross section in FIG. 5A. The half shields 121 are applied to the exterior of the mandrel 10 as shown previously after the antenna coil and substrate are moved to their final position on the mandrel and the bulkhead is inserted into the mandrel (see FIG. 3). The half shields 121 are affixed to each other by using cap screws 26 such as socket head cap screws. On one circumferential side of the half shields 121, a hole 26A is provided that has a large enough diameter to accept the head of the bolt 26. The other half shield 121 include the other side of the hole, shown at 26B, and such other side is preferably internally threaded to engage the threads on the bolt 26, thus enabling clamping the two half shields 121 together laterally. The arrangement shown in FIG. 5A includes bolt holes having opposed large diameter 26A and threaded 26B openings on opposed circumferential sides of the half shields 121. Such arrangement is preferred but is not a limit on the scope of the invention.

The shield 21 is preferably retained in its longitudinal position along the mandrel 10 by a pin or key 28. The key 28 may be in the form of a small, flat cylinder made from steel, monel or titanium, for example, and may rest in a machined surface therefor in the exterior surface of the mandrel 10. The key 28 may fit in a corresponding retaining surface machined into the interior surface of one of the half shields 121. A corresponding pin 28 may retain the other half shield 121. Other devices for longitudinally retaining the shield 21 will occur to those of ordinary skill in the art, bearing in mind that the mandrel 10 diameter will be slightly reduced by compression when the mandrel 10 is exposed to hydrostatic pressure.

Figure 5B:
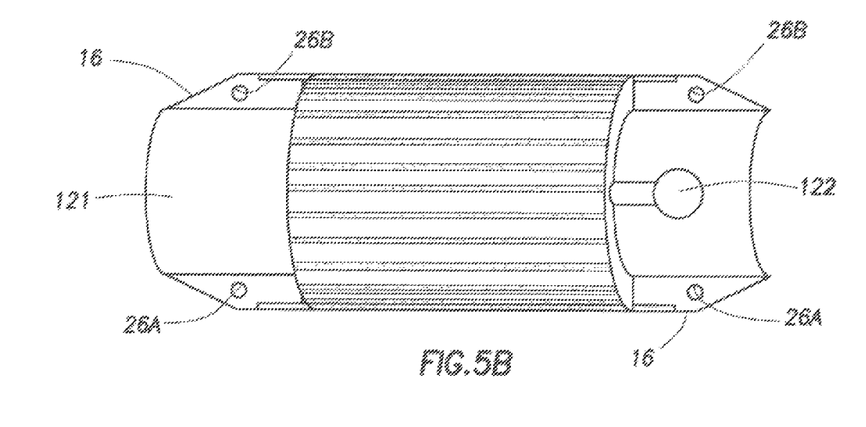

An oblique view of one of the half shields 121 is shown in FIG. 5B. The example shown in FIG. 5B may include wear bands 16 on its longitudinal ends, and may including hard-facing as explained with reference to FIG. 4B. The half shields 121 may include a recess 122 for the bulkhead (20 in FIG. 3). Making both half shields to the same configuration (such as having the recess 122 shown) can reduce manufacturing cost and reduce possible errors in assembling a well logging instrument.

If repairability is not important in any particular example the half shields 121 may be affixed to the mandrel be welding. Welding may be used in any other example to affix respective portions of the sensor to the mandrel if in such examples it is not important to be able to readily disassemble the sensor from the mandrel.

Figure 6A:
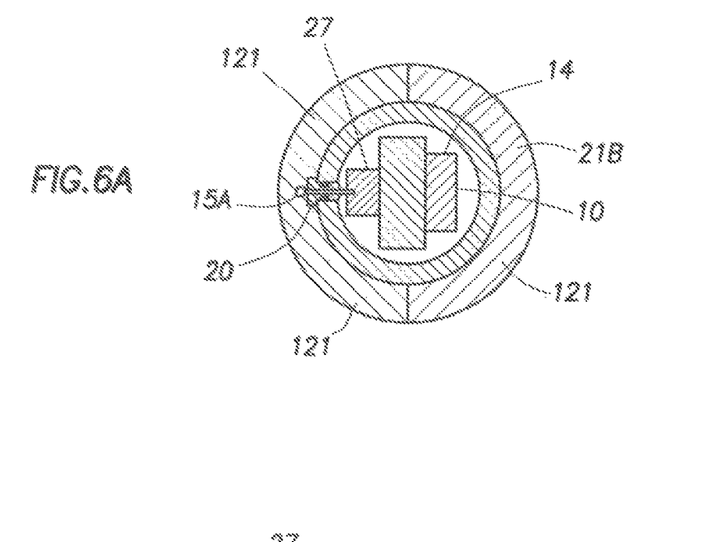
FIGS. 6A and 6B show examples of electrical coupling of a sensor to various circuits within the sonde mandrel.

One possible configuration for making electrical contact between the sensor and the electronic circuitry disposed inside the mandrel is shown in FIG. 6A. The electronic circuits 14 may include a socket 27 or similar female electrical connector disposed longitudinally under the opening where the bulkhead 20 is to be inserted through the wall of the mandrel 10. The socket 27 engages the electrical contacts (22 in FIG. 3) extending inwardly from the bulkhead 20. When the bulkhead 20 is inserted into the opening, therefore, the opening is sealed and electrical connection is made between the sensor (12 in FIG. 1A) and the circuitry 14.

Figure 6B:
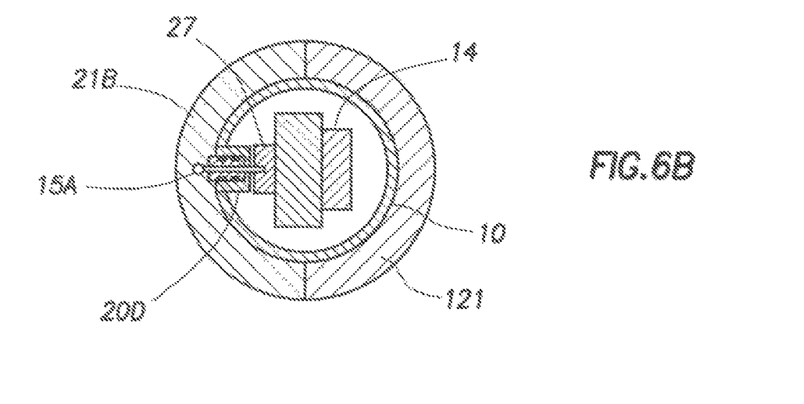

An alternative arrangement for mounting the bulkhead 20 is shown in FIG. 6B. Instead of having the bulkhead sealingly engage the interior of the opening in the wall of the mandrel 10 directly, the opening may include a receptacle 20D such as a bushing, insert or "bung" welded therein. The receptacle 20D can provide an extended length of sealing surface directed inwardly into the mandrel 10 so that suitable sealing around the bulkhead 20 may be attained even with a thinner wall mandrel. Thus, using a receptacle may enable making the instrument with a thinner wall mandrel. In some implementations the wall thickness may be at most 0.2 inches.

Figure 7:
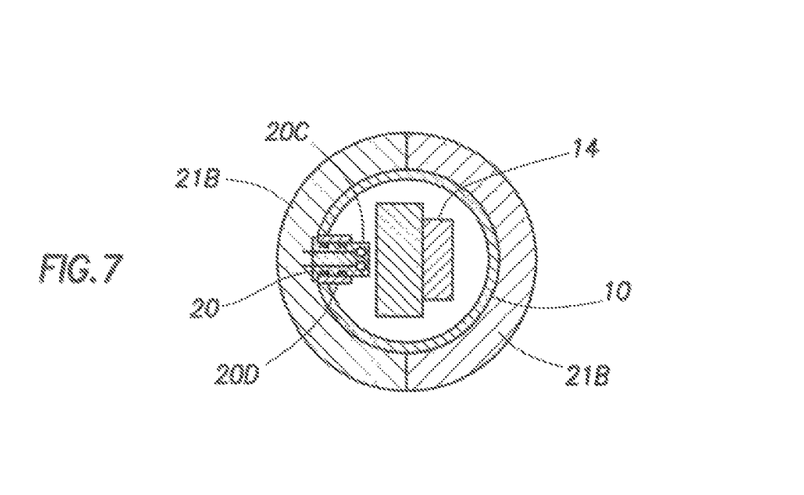
FIG. 7 shows another example of electrical coupling of the sensor to the circuits within the sonde mandrel.

Alternatively, and as shown in FIG. 7, the electronic chassis 14 may include electrical contact pins to engage sockets 20C in the interior end of the bulkhead 20. A possible advantage of using the pin and socket arrangement shown in FIG. 7 is that the electronic chassis 14 may be removed from the interior of the mandrel 10 without the need to remove the bulkheads 20.

Figure 8A:
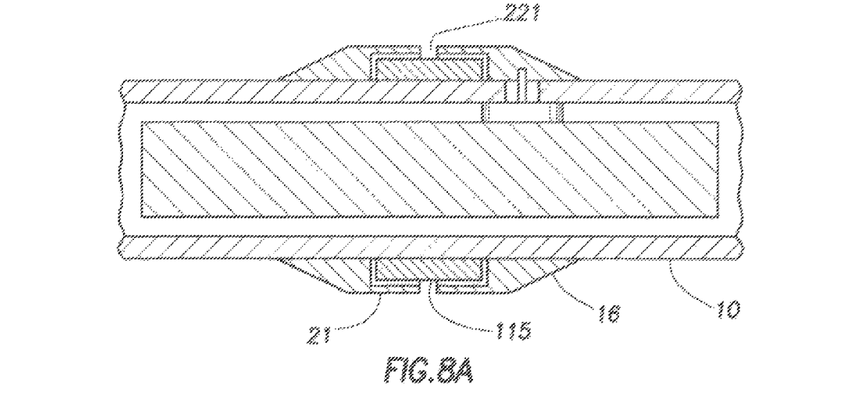
FIGS. 8A and 8B show, respectively, a cross section and side view of an example toroidal antenna mounted to a sonde mandrel according to the invention.
Figure 8B:
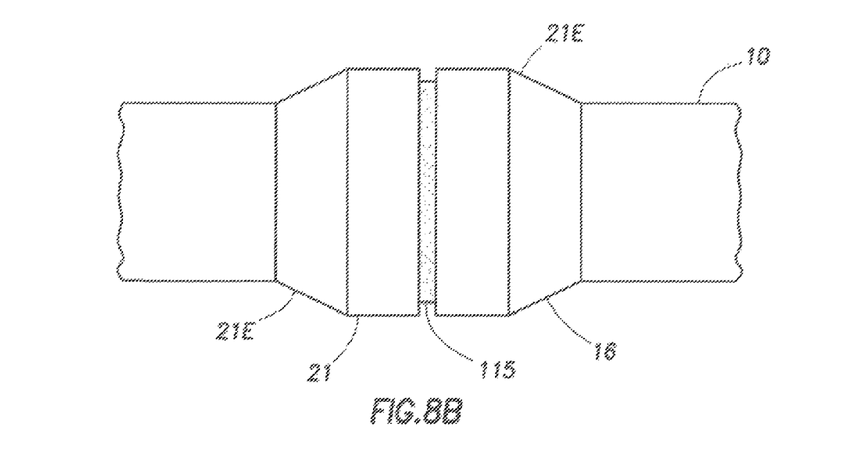

FIGS. 8A and 8B show, respectively, a cut away and oblique exterior view of one of the toroidal antennas (e.g., X1 through X5 in FIG. 2C). The toroidal antenna coil 115 may be formed into or on an insulating substrate (such as shown at 17 in FIG. 4A) and applied to the exterior of the mandrel 10 as explained with reference to FIG. 4A. The shield 21 for a toroidal antenna preferably has a continuous circumferential slot 221 to enable electromagnetic fields to exit the shield 21 from the toroidal antenna coil 115. To produce such a slot 221, the shield in the present example may be formed from two longitudinally separate shield sections 21E, one such section 21E on either longitudinal end of the coil 115 as shown in FIG. 8A. The shield segments may themselves be formed from circumferentially separated and bolted together half sections, such as explained above with reference to FIG. 5A. The sections 21E may be retained in respective longitudinal positions using pins or keys also as explained with reference to FIG. 5A. As a practical consideration, at least one key should be provided for each section 21E to enable proper longitudinal positioning of the sections 21E. An exterior, oblique view of the shield 21 for the toroidal antenna is shown in FIG. 8B.

Figure 9A:
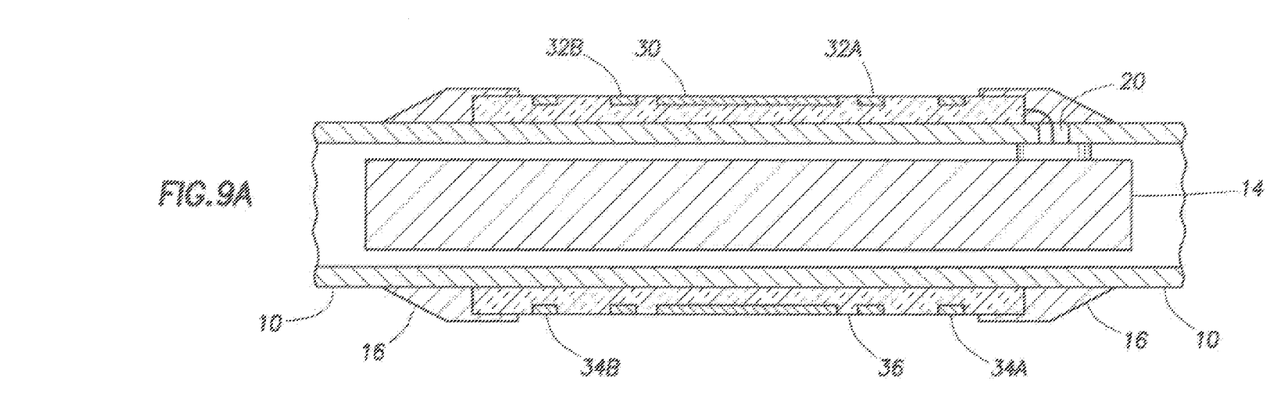
FIGS. 9A and 9B show, respectively, a cross section and a side view of an example set of electrodes mounted to a sonde mandrel according to the invention.
Figure 9B:
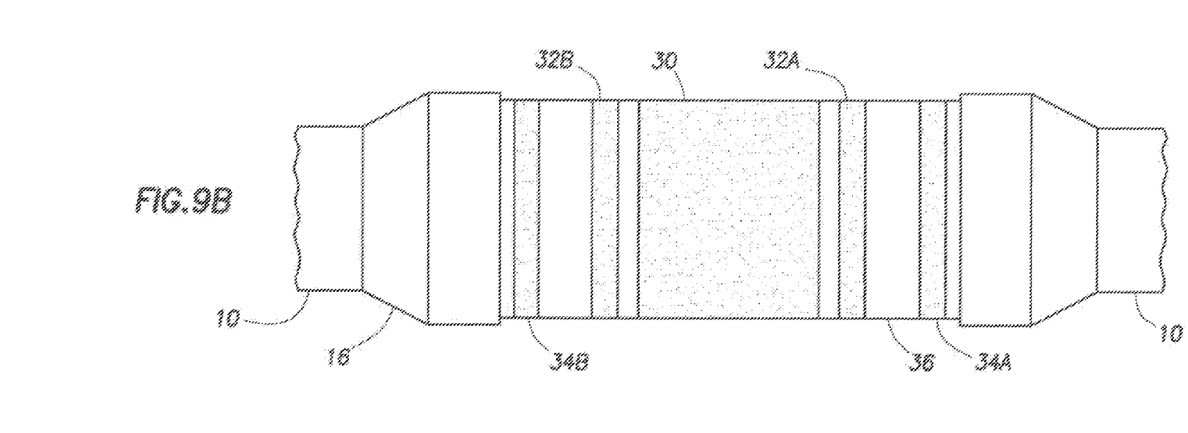

An example galvanic electrode array is shown in cut away view in FIG. 9A and in exterior view in FIG. 9B. Such galvanic electrode array may include a number of different electrodes arranged to provide certain voltage measurement points for a galvanic resistivity measuring device. As shown in FIG. 9A, each electrode on the array may be made from an electrically conductive metal band, e.g. measure electrode 30, measure monitor electrodes 32A and 32B disposed longitudinally on either side of the measure electrode 30, and tube monitor electrodes 34A, 34B disposed longitudinally on either side of a corresponding one of the measure monitor electrodes 32A, 32B. The bands are applied to the exterior of an electrically insulating substrate 36, such may be made from rubber or other elastomer or epoxy resin (as may also be reinforced by glass fiber). Electrical leads from each of the rings may be coupled to a multi-pin bulkhead as may be obtained from Kemlon Products and Development, as described above. The rings and substrate 36 may be retained in longitudinal position on the exterior of the mandrel 10 by wear bands 16 at each longitudinal end of the substrate 36. The wear bands may be assembled from circumferential segments as explained with reference to the shield in FIG. 5A, and may themselves be retained in longitudinal position by keys, also as explained with reference to FIG. 5A. An oblique view of the electrode array is shown in FIG. 9B.

In some implementations, a well logging instrument may include all galvanic electrodes for the sensors made as described herein, and may be configured to make measurements similar to those made by an instrument known as a "dual laterolog" instrument, such as described in U.S. Reissue Pat. No. RE32,564 issued to Scholberg and assigned to the assignee of the present invention.

Figure 9C:
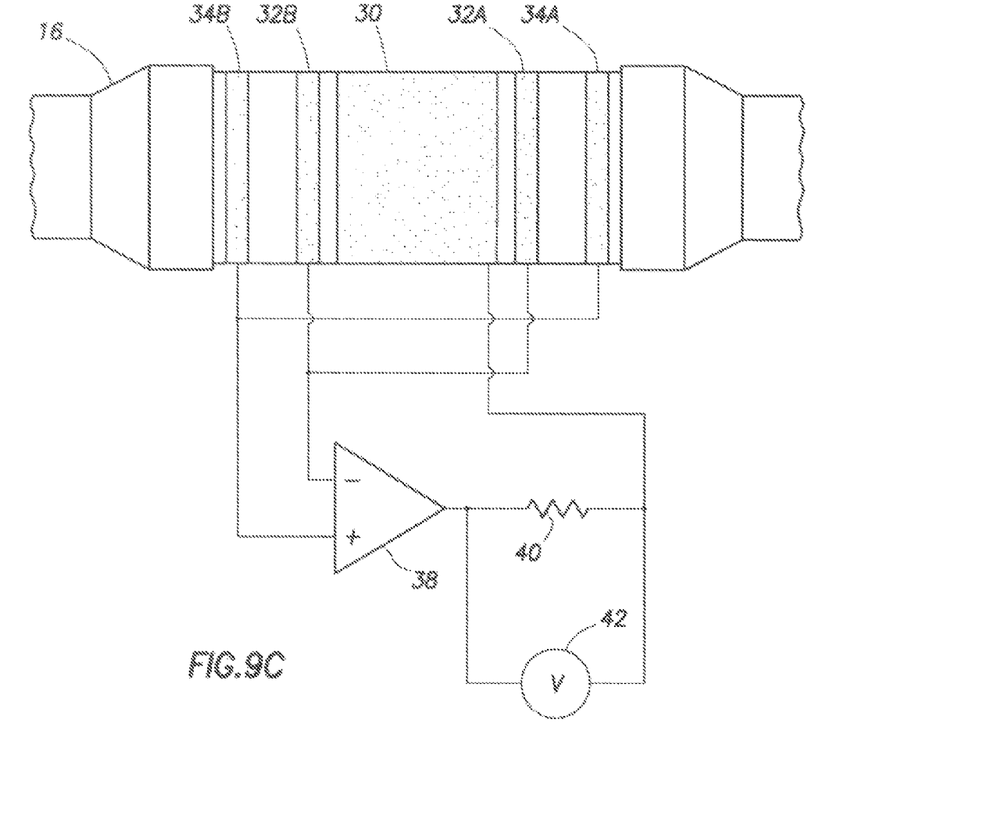
FIG. 9C shows one example monitoring circuit that may be used with the electrodes set shown in FIGS. 9A and 9B.

One possible electrical configuration for the various electrodes explained with reference to FIGS. 9A and 9B is shown in FIG. 9C. The tube monitor electrodes 34A, 34B may be coupled to one input of an operational amplifier 38. The measure monitor electrodes 32A, 32B may be coupled to the other input (inverting) thereof. Output of the operational amplifier 38n may be coupled through a resistor 40 to the measure electrode 30. A voltage drop across the resistor 40 may be measured by a voltage measuring circuit 42 forming part of the electronic circuitry (14 in FIG. 1A).

Figure 10A:
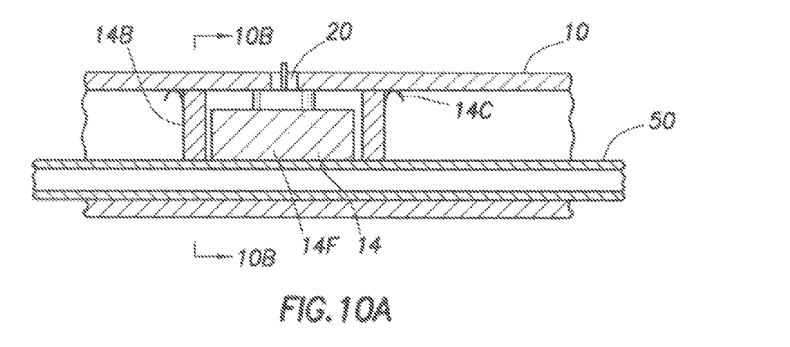
FIGS. 10A and 10B show, respectively, a cross section and end view of one example of mounting circuitry within the sonde mandrel to reduce electrical noise.

FIG. 10A shows a cut away view of one example of internal instrument configuration intended to reduce electromagnetic interference on the various components inside the mandrel 10. The electronics 14 may be enclosed in an electrically conductive metal shield 14F. The shield 14F may itself be coupled to an electrically conductive, metal wiring conduit 50 that extends longitudinally within the mandrel 10 on one side, such as in contact with the inner wall of the mandrel 10 as shown in FIG. 10A. Electromagnetic interference may be stopped from traveling longitudinally along the interior of the mandrel by including electrically conductive metal walls 14B disposed on each longitudinal side of the electronics 14. The walls may occupy substantially all of the cross section of the interior of the mandrel 10 not occupied by the conduit 50. Good electrical contacts may be made between the walls 14B and the interior of the mandrel 10 by devices such as contact springs 14C. The contact springs 14C may be made from beryllium copper or similar electrically conductive, corrosion resistant spring material.

Figure 10B:
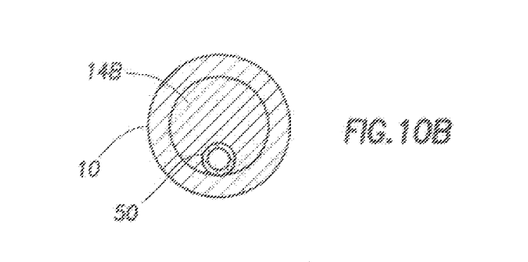

A cross section of the interior of the mandrel 10 at the position of one of the walls 14B is shown in FIG. 10B to illustrate the relative arrangement of the components. As explained above with reference to FIG. 10A, the walls 14B occupy substantially all of the interior cross section of the mandrel 10 not occupied by the conduit 50.

Figure 11A:
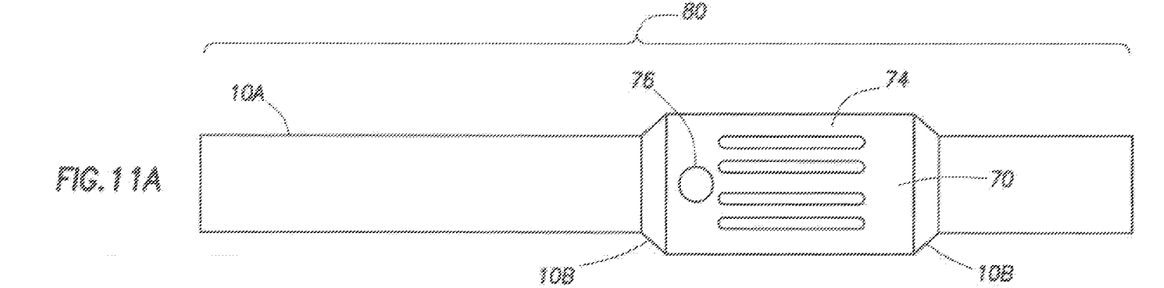
FIGS. 11A and 11B show, respectively, an oblique view and a cut away view of a modular welded sensor.
Figure 11B:
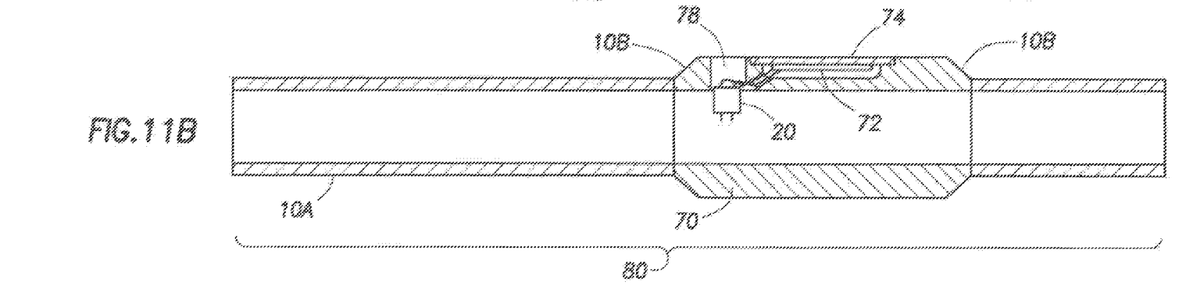

In another aspect, the invention relates to "modular" sensors that may be formed by welding a sensor onto a mandrel, and welding together a plurality of such modular sensors to form an instrument. Referring to FIG. 11A, a modular sensor 80 may be made be affixing a sensor 70 onto a mandrel segment 10A. The mandrel segment 10A may be a shorter version of the sonde mandrel described above, with, for example, length in a range of about 0.25 to 2 meters. The sensor 70 may be any sensor as explained above that can be affixed to the exterior of the mandrel segment 10A. The sensor may include a shield 71 substantially as explained above. The shield may include an access port 76 for the feedthrough bulkhead (20 in FIG. 11B). In the present example, the sensor 70 and shield 71 are moved to the appropriate position along the exterior of the mandrel segment 10A, and then the shield 71 may be affixed to the mandrel segment 10A by welding, such as shown at 10B in FIG. 11A. A cut away view of the modular sensor 80 is shown in FIG. 11B wherein the relative locations of the various components of the sensor including an antenna coil 72 and a portion 74 of the shield 71, as well as the bulkhead 20.

Figure 12:
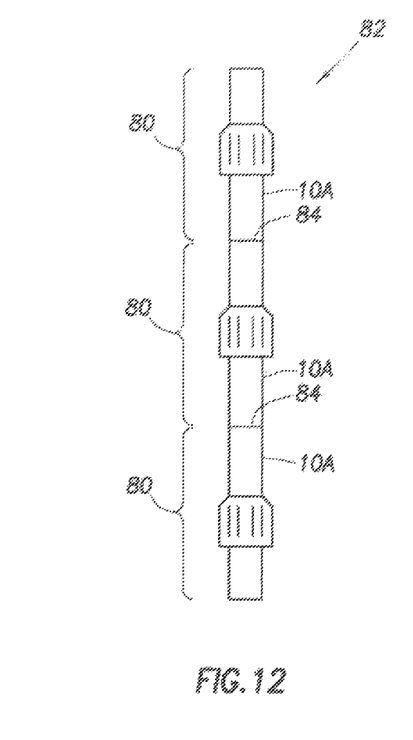
FIG. 12 shows an instrument made from a plurality of the modular sensors shown in FIGS. 11A and 11B.

In the present example, a plurality of such modular sensors 80 may be assembled to form an instrument. An example of such instrument is shown in FIG. 12, wherein three such modular sensors 80 are joined at the longitudinal ends of each mandrel segment 10A to an adjacent mandrel segment 10A, such as by butt welds 84. Assembly of electronics (14 in FIG. 10A) to such an instrument may be made as previously explained herein. If the spacing between various modular sensors is to be varied, it will be appreciated by those skilled in the art that the mandrel segment may be lengthened by welding in a length of tube having diameter and wall thickness dimensions similar to that of the mandrel segments 10A, or the mandrel segments 10A may have an end portion thereof removed. It is within the scope of the invention to use any other technique to join the mandrel segments together end to end, for example, threaded couplings, capscrews through the wall of the segments. Welding has the advantages of providing a fluid-tight seal to the segments where joined, and can eliminate the need for separate sealing where two segments are joined end to end.

A well logging instrument made according to the various aspects of the invention may have lower manufacturing cost, may be easier to maintain, and may be lighter weight than comparable well logging instruments made using an electrically non-conductive sonde mandrel and separate electronics housing. Instruments made according to the various aspects of the invention may also be readily placed at any longitudinal position within an assembly of well logging instruments. Well logging instruments known in the art prior to the present invention that use a non-conductive sonde mandrel are typically required to be located at the lowest position on an assembly of instruments because non-conductive sonde mandrels may be unable to withstand the loading of instruments coupled below.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only be the attached claims.

What is claimed is:

1. A well logging instrument, comprising:
an electrically conductive sonde mandrel, the mandrel having a wall thickness of at most about 0.35 inches;
at least one electrical sensor affixed to an exterior of the mandrel, the at least one sensor configured to be affixed to the mandrel by sliding along an exterior surface thereof; and a pressure-sealing electrical feedthrough bulkhead making electrical connection from the at least one sensor through a wall of the mandrel, wherein the at least one electrical sensor is selected from one of an antenna, a toroidal antenna and an electrode, and comprises an electrically conductive element disposed on an insulating substrate, the conductive element and the substrate configured to engage the mandrel by sliding over an exterior surface thereof, and further comprising a shield engaged with the at least one sensor on an exterior surface of the mandrel, the shield including at least one feature to maintain a longitudinal position thereof along the mandrel, wherein the shield is made from electrically conductive material and includes at least one opening for movement therethrough of electromagnetic radiation.

2. The instrument of claim 1 wherein an opening in a wall of the mandrel includes a receptacle affixed therein for sealingly receiving the electrical feedthrough.

3. The instrument of claim 1 further comprising electrical circuits disposed inside the mandrel and electrically coupled to the at least one sensor through the electrical feedthrough bulkhead.

4. The instrument of claim 3 further comprising an electrically conductive interior wall disposed proximate each longitudinal end of the electronic circuits, the interior walls occupying substantially an entire cross section of the interior of the mandrel.

5. The instrument of claim 4 further comprising a contact spring associated with each wall to make electrical contact between the associated wall and an interior surface of the mandrel.

6. The instrument of claim 1 further comprising an electrically conductive conduit disposed inside the mandrel, the conduit configured to electrically shield wiring therein.

7. The instrument of claim 1 wherein the sensor is affixed to the exterior of the mandrel by welding.

8. The well logging instrument of claim 1 wherein the mandrel comprises: a plurality of electrically conductive sonde mandrel segments joined end to end, each segment having at least one sensor affixed to an exterior of the mandrel segment, the at least one sensor configured to be affixed to the mandrel segment by sliding along an exterior surface thereof.

9. A well logging instrument, comprising:

an electrically conductive sonde mandrel, the mandrel having an external diameter of at most 3.75 inches;

at least one electrical sensor affixed to an exterior of the mandrel, the at least one sensor configured to be affixed to the mandrel by sliding along an exterior surface thereof; and a pressure-sealing electrical feedthrough bulkhead making electrical connection from the at least one sensor through a wall of the mandrel, electrical circuits disposed inside the mandrel and electrically coupled to the at least one sensor through the electrical feedthrough bulkhead, further comprising an electrically conductive interior wall disposed proximate each longitudinal end of the electronic circuits, the interior walls occupying substantially an entire cross section of the interior of the mandrel.

10. The instrument of claim 9 further comprising a contact spring associated with each wall to make electrical contact between the associated wall and an interior surface of the mandrel.

11. The instrument of claim 9 further comprising an electrically conductive conduit disposed inside the mandrel, the conduit configured to electrically shield wiring therein.

12. The instrument of claim 9 wherein the mandrel has a wall thickness of at most 0.35 inches.

13. The instrument of claim 9 wherein the sensor is affixed to the mandrel by welding.

14. The well logging instrument of claim 9 wherein the mandrel comprises:

a plurality of electrically conductive sonde mandrel segments joined end to end, each segment having at least one sensor affixed to an exterior of the mandrel segment, the at least one sensor configured to be affixed to the mandrel segment by sliding along an exterior surface thereof.

15. A method for making a well logging instrument, comprising:

moving at least one electrical sensor longitudinally to a selected position along an exterior surface of an electrically conductive sonde mandrel, the sonde mandrel having at least one of a wall thickness of at most about 0.35 inches and an external diameter of at most about 3.75 inches;

affixing the at least one electrical sensor to the sonde mandrel; and making electrical connection to a component disposed in an interior of the sonde mandrel by coupling the sensor through an opening in a wall of the mandrel using a pressure sealing electrical feedthrough wherein the sonde mandrel is formed by joining a plurality of mandrel segments end to end, each segment including thereon at least one electrical sensor coupled to the segment by moving each electrical sensor to a selected position along an exterior surface of each mandrel segment and affixing each sensor each selected position.

16. The method of claim 15 further comprising segregating an interior of the sonde mandrel into at least one electrostatically isolated compartment by disposing in an interior thereof an electrically conductive interior wall, the interior wall occupying substantially an entire cross section of the interior of the mandrel.

17. The method of claim 15 further comprising disposing an electrically conductive conduit inside the mandrel, the conduit configured to electrically shield wiring therein.

* * * * *